US012165384B2

(12) United States Patent
Rao et al.

(10) Patent No.: US 12,165,384 B2
(45) Date of Patent: Dec. 10, 2024

(54) METHODS AND SYSTEMS FOR AUTOMATED CROSS-BROWSER USER INTERFACE TESTING

(71) Applicant: FMR LLC, Boston, MA (US)

(72) Inventors: Natesh Lakshman Rao, Bangalore (IN); Lakshmi Radhakrishnan, Bangalore (IN); Ankita Upadhyay, Bangalore (IN); Pallwee, Gopalganj (IN)

(73) Assignee: FMR LLC, Boston, MA (US)

( * ) Notice: Subject to any disclaimer, the term of this patent is extended or adjusted under 35 U.S.C. 154(b) by 248 days.

(21) Appl. No.: 17/746,725

(22) Filed: May 17, 2022

(65) Prior Publication Data
US 2023/0377309 A1    Nov. 23, 2023

(51) Int. Cl.
G06V 10/74    (2022.01)
G06F 11/36    (2006.01)
G06V 10/75    (2022.01)
G06V 30/19    (2022.01)

(52) U.S. Cl.
CPC ........ *G06V 10/761* (2022.01); *G06F 11/3664* (2013.01); *G06V 10/751* (2022.01); *G06V 10/753* (2022.01); *G06V 10/754* (2022.01); *G06V 10/759* (2022.01); *G06V 30/19093* (2022.01)

(58) Field of Classification Search
CPC .............. G06F 11/3664; G06V 10/761; G06V 10/753; G06V 10/751; G06V 10/759; G06V 10/754; G06V 30/19093
See application file for complete search history.

(56) References Cited

U.S. PATENT DOCUMENTS

| | | | |
|---|---|---|---|
| 6,690,828 B2 * | 2/2004 | Meyers | G06V 10/40 358/521 |
| 7,493,520 B2 * | 2/2009 | Bhatia | G06F 11/3688 717/130 |
| 7,836,346 B1 | 11/2010 | Davidov et al. | |

(Continued)

OTHER PUBLICATIONS

V. Lelli et al., "Classifying and Qualifying GUI Defects," arXiv: 1703.09567v1 [cs.SE] Mar. 28, 2017, available at arxiv.org/pdf/1703.09567, 10 pages.

*Primary Examiner* — Douglas M Slachta
(74) *Attorney, Agent, or Firm* — Cesari and McKenna, LLP

(57) ABSTRACT

Methods and apparatuses are described for automated cross-browser user interface testing. A computing device captures (i) a first image file corresponding to a first current user interface view of a web application on a first testing platform and (ii) a second image file corresponding to a second current user interface view of a web application on a second testing platform. The computing device prepares the image files, and compares the prepared image files using a structural similarity index measure. The computing device determines that the prepared first image file and the prepared second image file represent a common user interface view when the structural similarity index measure is within a predetermined range. The computing device highlights corresponding regions that visually diverge from each other in each of the prepared image files and transmits a notification message comprising the highlighted image files.

26 Claims, 14 Drawing Sheets

(56) References Cited

U.S. PATENT DOCUMENTS

| | | |
|---|---|---|
| 8,010,500 B2 | 8/2011 | Chun et al. |
| 8,161,399 B2 | 4/2012 | Kannan et al. |
| 8,682,083 B2 * | 3/2014 | Kumar ................ G06F 11/3688 382/218 |
| 8,850,305 B1 | 9/2014 | Kent |
| 9,164,874 B1 * | 10/2015 | Tomay ................ G06F 11/3672 |
| 9,934,129 B1 * | 4/2018 | Budurean ........... G06F 11/3692 |
| 10,186,049 B1 * | 1/2019 | Boardman ................ G06T 7/55 |
| 10,387,292 B2 | 8/2019 | Budurean et al. |
| 10,902,644 B2 * | 1/2021 | Cook ................... G06T 7/0002 |
| 10,909,024 B2 * | 2/2021 | Li ....................... G06F 11/3664 |
| 10,963,731 B1 | 3/2021 | Sarkar et al. |
| 11,341,179 B1 * | 5/2022 | Brandwine ........... G06F 16/532 |
| 11,694,457 B2 * | 7/2023 | Hines ..................... G06V 30/40 382/159 |
| 2011/0231823 A1 | 9/2011 | Fryc et al. |
| 2011/0265175 A1 * | 10/2011 | Bhat ................... G06F 11/3672 726/19 |
| 2011/0276946 A1 * | 11/2011 | Pletter ................ G06F 11/3688 717/124 |
| 2013/0188886 A1 * | 7/2013 | Petrou .................... H04N 23/00 382/305 |
| 2015/0220809 A1 * | 8/2015 | Kawabata .......... H04N 1/00015 382/195 |
| 2015/0294100 A1 * | 10/2015 | King .................. H04W 12/065 726/19 |
| 2015/0339213 A1 | 11/2015 | Lee et al. |
| 2018/0300225 A1 | 10/2018 | Topholt et al. |
| 2018/0370029 A1 | 12/2018 | Hall et al. |
| 2019/0227917 A1 | 7/2019 | Henry et al. |
| 2019/0384699 A1 | 12/2019 | Arbon et al. |
| 2020/0034279 A1 | 1/2020 | Shivam et al. |
| 2021/0150126 A1 * | 5/2021 | McCulloh ............. G06F 16/116 |
| 2021/0390011 A1 * | 12/2021 | Cser ..................... G06F 11/3692 |
| 2024/0177836 A1 * | 5/2024 | Paik ....................... G06T 7/0012 |

* cited by examiner

```
1   # Generated by Selenium IDE
2   import pytest
3   import time
4   import json
5   from selenium import webdriver
6   from selenium.webdriver.common.by import By
7   from selenium.webdriver.common.action_chains import ActionChains
8   from selenium.webdriver.support import expected_conditions
9   from selenium.webdriver.support.wait import WebDriverWait
10  from selenium.webdriver.common.keys import Keys
11  from selenium.webdriver.common.desired_capabilities import DesiredCapabilities
12  class TestDebtRecording():
13      def setup_method(self, method):
14          self.driver = webdriver.Chrome()                                    304
15          self.vars = {}
16  
17      def teardown_method(self, method):
18          self.driver.quit()
19  
20      def test_debtRecording(self):
21          self.driver.get("https://testurl.com/testapplication/RICust/Login/InitAuthedUr
22          self.driver.set_window_size(1936, 1056)
23          self.driver.find_element(By.ID, "userid-input").send_keys("guest1")
24          self.driver.find_element(By.ID, "password").click()
25          self.driver.find_element(By.ID, "password").send_keys("12i2z2")
26          self.driver.find_element(By.ID, "fs-login-button").click()
```

```
capabilities = DesiredCapabilities.INTERNETEXPLORER
capabilities["platform"] = "windows"
capabilities["browserName"] = "internet explorer"
capabilities["ignoreProtectedModeSettings"] = True
capabilities["introduceInstabilityByIgnoringProtectedModeSettings"] = True
capabilities["nativeEvents"] = True
capabilities["ignoreZoomSetting"] = True
capabilities["requireWindowFocus"] = True
capabilities["introduceFlakinessByIgnoringSecurityDomains"] = True
...
```

FIG. 4

*Converted screenshot from IE™ 11*

*Converted screenshot from Chrome*™

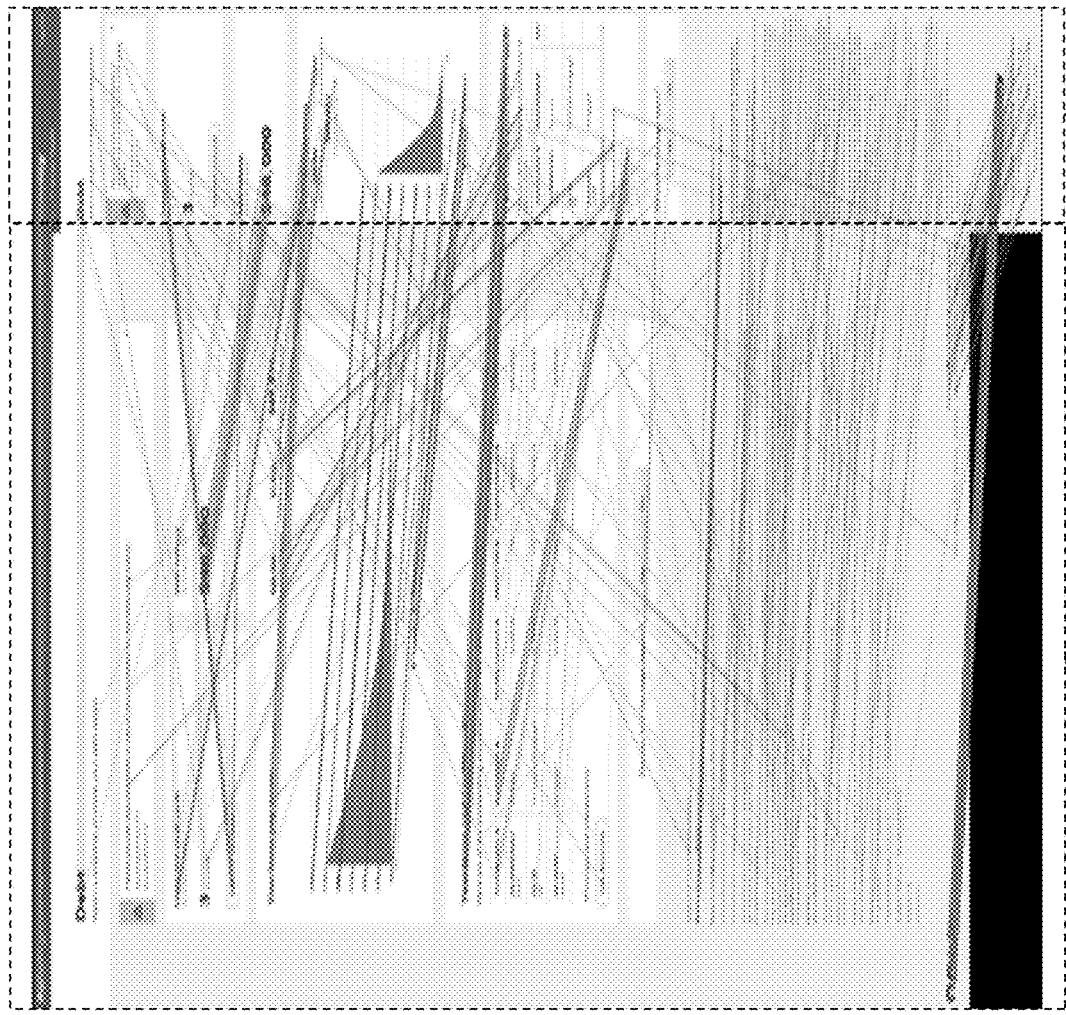

METHODS AND SYSTEMS FOR AUTOMATED CROSS-BROWSER USER INTERFACE TESTING

TECHNICAL FIELD

This application relates generally to methods and apparatuses, including computer program products, for automated cross-browser user interface testing.

BACKGROUND

In today's computing environment, developers of web applications must ensure that their web site is rendered accurately and uniformly across dozens of different platforms, that is different hardware devices (such as mobile devices) that may be utilizing any number of different browser types or versions (e.g., Internet Explorer™, Chrome™, Safari™, etc.) executing on individual operating system types or versions, and using different screen sizes and/or screen resolutions. It is critical that web applications are responsive no matter what platform a client device is using and that each particular web page in a given web application displays every user interface (UI) element consistently and completely for each platform.

The ability to test each of these platforms accurately and efficiently is severely hampered by existing test automation processes and tools, many of which rely on manual comparison of a web application across platforms to determine if any anomalies exist. This places an enormous burden on technical support staff and in most cases, such test analysis and platform comparison cannot be accomplished sufficiently—resulting in a less-than-optimal user experience for web applications on certain platforms.

SUMMARY

Therefore, what is needed are methods and systems for automated cross-browser user interface testing that enables advanced computing techniques, such as image processing and image comparison, optical character recognition, and image annotation, to automatically analyze images of UI screens captured during software application testing, determine whether the images represent the same common user interface view using advanced similarity measures, identify any anomalies present in the images, and notify appropriate development and/or QA teams to provide an efficient way to detect and address such errors without relying on large amounts of development time devoted to such work—thereby enabling engineers and developers to spend resources on other projects.

The invention, in one aspect, features a computerized method of automated cross-browser user interface testing. A computing device captures a first image file corresponding to a first current user interface view of a web application on a first testing platform. The computing device captures a second image file corresponding to a second current user interface view of a web application on a second testing platform. The computing device prepares the first image file and the second image file for comparison. The computing device compares the prepared first image file to the prepared second image file using a structural similarity index measure. The computing device determines that the prepared first image file and the prepared second image file represent a common user interface view when the structural similarity index measure is within a predetermined range. The computing device highlights one or more corresponding regions in each of the prepared first image file and the prepared second image file that visually diverge from each other. The computing device transmits a notification message to one or more remote computing devices for display, the notification message comprising the highlighted prepared first image file and the highlighted prepared second image file.

The invention, in another aspect, features a system for automated cross-browser user interface testing. The system comprises a computing device with a memory for storing computer-executable instructions and a processor that executes the computer-executable instructions. The computing device captures a first image file corresponding to a first current user interface view of a web application on a first testing platform. The computing device captures a second image file corresponding to a second current user interface view of a web application on a second testing platform. The computing device prepares the first image file and the second image file for comparison. The computing device compares the prepared first image file to the prepared second image file using a structural similarity index measure. The computing device determines that the prepared first image file and the prepared second image file represent a common user interface view when the structural similarity index measure is within a predetermined range. The computing device highlights one or more corresponding regions in each of the prepared first image file and the prepared second image file that visually diverge from each other. The computing device transmits a notification message to one or more remote computing devices for display, the notification message comprising the highlighted prepared first image file and the highlighted prepared second image file.

Any of the above aspects can include one or more of the following features. In some embodiments, the first testing platform and the second testing platform comprise different operating systems or different versions of a same operating system. In some embodiments, the first platform and the second platform comprise different hardware devices or different hardware device form factors. In some embodiments, the web application on the first platform is rendered using a different browser type than the browser type that render the web application on the second platform.

In some embodiments, preparing the first image file and the second image file for comparison comprises one or more of: adjusting a size of the first image file to match a size of the second image file, adjusting a size of the second image file to match a size of the first image file, converting the first image file and the second image file to greyscale images, converting the first image file and the second image file to a hue-saturation-value (HSV) representation, or removing text from each of the first image file and the second image file. In some embodiments, removing text from each of the first image file and the second image file comprises performing an optical character recognition (OCR) process on each of the first image file and the second image file and removing text identified via the OCR process from each of the first image file and the second image file. In some embodiments, the removed text from the first image file is compared to the removed text from the second image file to determine one or more similarities or differences.

In some embodiments, the structural similarity index measure is based on a comparison between one or more pixels of the prepared first image file and one or more pixels of the prepared second image file. In some embodiments, highlighting one or more corresponding regions in each of the prepared first image file and the prepared second image file that visually diverge from each other comprises generating a contour around each of the one or more corresponding regions in each of the prepared first image file and the prepared second image file that visually diverge from each other. In some embodiments, the contour comprises a visual indicator identifying the corresponding regions in each of the prepared first image file and the prepared second image file.

In some embodiments, the first current user interface view of the web application on the first testing platform comprises one of: a view of an entire web page in the web application or a view of a single user interface element of the web page in the web application. In some embodiments, the second current user interface view of the web application on the second testing platform comprises one of: a view of an entire web page in the web application or a view of a single user interface element of the web page in the web application. In some embodiments, comparing the prepared first image file to the prepared second image file using a structural similarity index measure comprises using a scale invariant feature transform to compare the prepared first image file to the prepared second image file when sizes and orientations of the prepared first image file and the prepared second image file are different.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of an exemplary baseline test script excerpt generated by browser testing frameworks.

FIG. 4 is a diagram of an exemplary set of browser capability parameters.

FIG. 9 is a diagram of a side-by-side comparison between the first image file and the second image with key points identifying local image features in the images and plotted to show the matching features using scale invariant feature transform.

DETAILED DESCRIPTION

Figure 1:
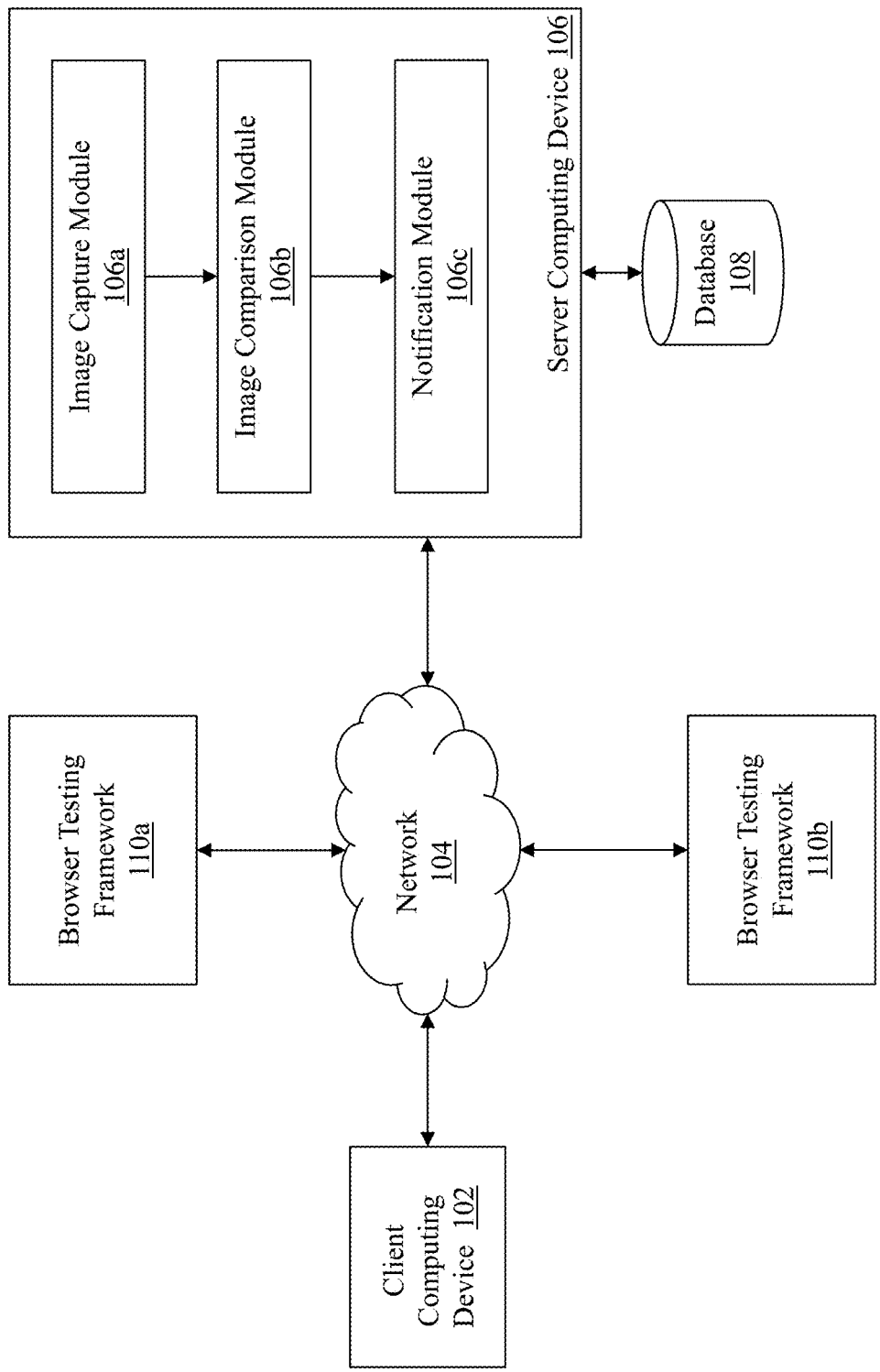
FIG. 1 is a block diagram of a system for automated cross-browser user interface testing.

FIG. 1 is a block diagram of a system 100 for automated cross-browser user interface testing. System 100 includes client computing device 102, communications network 104, server computing device 106 with image capture module 106a, image comparison module 106b, and notification module 106c, database 108, and browser testing frameworks 110a, 110b.

Client computing device 102 uses software and circuitry (e.g., processor, memory) to execute applications and to communicate with server computing device 106 and one or more of browser testing frameworks 110a, 110b via communication network 104 (e.g., using software installed on the device to connect to the Internet via communication circuitry, such as a network interface card or WiFi antenna) for the purposes of automated cross-browser user interface testing as described herein. Example client computing devices 102 can include, but are not limited to, a desktop computer, laptop computer, tablet, smartphone, mobile device or other similar types of computing devices.

Communication network 104 enables components of system 100 to communicate with each other using a packet-based protocol (e.g., IP). Network 104 may be a local network, such as a LAN, or a wide area network, such as the Internet. In some embodiments, network 104 is comprised of several discrete networks and/or sub-networks (including related routing, load balancing, and traffic metering hardware).

Server computing device 106 is a combination of hardware and software modules that includes specialized hardware and/or software modules that execute on a processor and interact with memory modules of server computing device 106, to receive data from database 108, to transmit data to database 108, and to communicate with the other devices of the system 100 (e.g., client device 102, browser testing frameworks 110a, 110b) in order to perform functions for automated cross-browser user interface testing as described herein. Server computing device 106 includes image capture module 106a, image comparison module 106b, and notification module 106c (as mentioned above) that execute on and/or interact with the processor of server computing device 106.

In some embodiments, image capture module 106a, image comparison module 106b, and notification module 106c are specialized sets of computer software instructions programmed onto one or more dedicated processors in server computing device 106 and can include specifically-designated memory locations and/or registers for executing the specialized computer software instructions. Although image capture module 106a, image comparison module 106*b*, and notification module 106*c* are shown in FIG. 1 as executing within a single server computing device 106, in some embodiments the functionality of modules 106*a*-106*c* can be distributed among a plurality of server computing devices. As shown in FIG. 1, server computing device 106 enables image capture module 106*a*, image comparison module 106*b*, and notification module 106*c* to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of image capture module 106*a*, image comparison module 106*b*, and notification module 106*c* is described in detail throughout the specification.

Database 108 is a computing device (or in some embodiments, a set of computing devices) coupled to server computing device 106 and is configured to receive, generate, and store specific segments of data relating to the process of automated cross-browser user interface testing as described herein. In some embodiments, all or a portion of database 108 can be integrated with server computing device 106 or be located on a separate computing device or devices. Database 108 can comprise one or more databases configured to store portions of data used by the other components of system 100, as will be described in greater detail below.

Browser testing frameworks 110*a*, 110*b* each comprise a computing device or devices that provides one or more test automation software tools (e.g., Sahi™, Selenium™, or other similar tools) that provide functionality for executing test scripts against web-based applications and capturing one or more screenshots of a web page or other type of visual display/user interface rendered in the web-based application. Browser testing frameworks 110*a*, 110*b* are accessible via software installed at client computing device 102, e.g., a user at client device 102 can initiate execution of test scripts (e.g., code files that automatically execute features and functions of a web application) at one or more of browser testing frameworks 110*a*, 110*b*. An exemplary web-based application provided by frameworks 110*a*, 110*b* for testing can be a website (e.g., comprising one or more web pages) that is accessed by the client computing device 102 and visually rendered via browser software (e.g., Chrome™, Safari™, or other similar web browsers) executing on either the frameworks 110*a*, 110*b* or client device 102, although other types of web-based applications for testing can be contemplated within the scope of invention. In one example, browser testing frameworks 110*a*, 110*b* can connect to client computing device 102 via an HTTP session in browser software to receive commands for the execution of particular test scripts and to provide application data and test results in response to the requests. As mentioned above, it is critical for automation test engineers, developers, and quality assurance technicians to be able to automatically and seamlessly test web-based applications across a wide spectrum of browser software, operating system software, and/or client device form factors. Therefore, browser testing frameworks 110*a*, 110*b* can be configured to provide testing capabilities for web applications and web pages over a variety of different browsers, hardware devices, form factors, and/or operating systems (each combination of which can be referred to as a platform or testing platform).

In one embodiment, a user at client computing device 102 issues a command to browser testing frameworks 110*a*, 110*b* for the execution of one or more automation test scripts against, e.g., one or more web applications being tested. In some cases, along with the web application to be tested, the user specifies a particular browser type/version, device operating system and/or hardware device/form factor to be tested. Browser testing frameworks 110*a*, 110*b* then executes the test scripts to activate functionality of the web application(s) for testing, and to capture corresponding outcomes and resulting files from execution of the test scripts (e.g., logs, image screenshots of the web application UI, message notifications, etc.). In some embodiments, browser testing frameworks 110*a*, 110*b* can transmit files that result from test execution to client computing device 102, server computing device 106, database 108 for storage or processing as will be explained herein.

Figure 2:
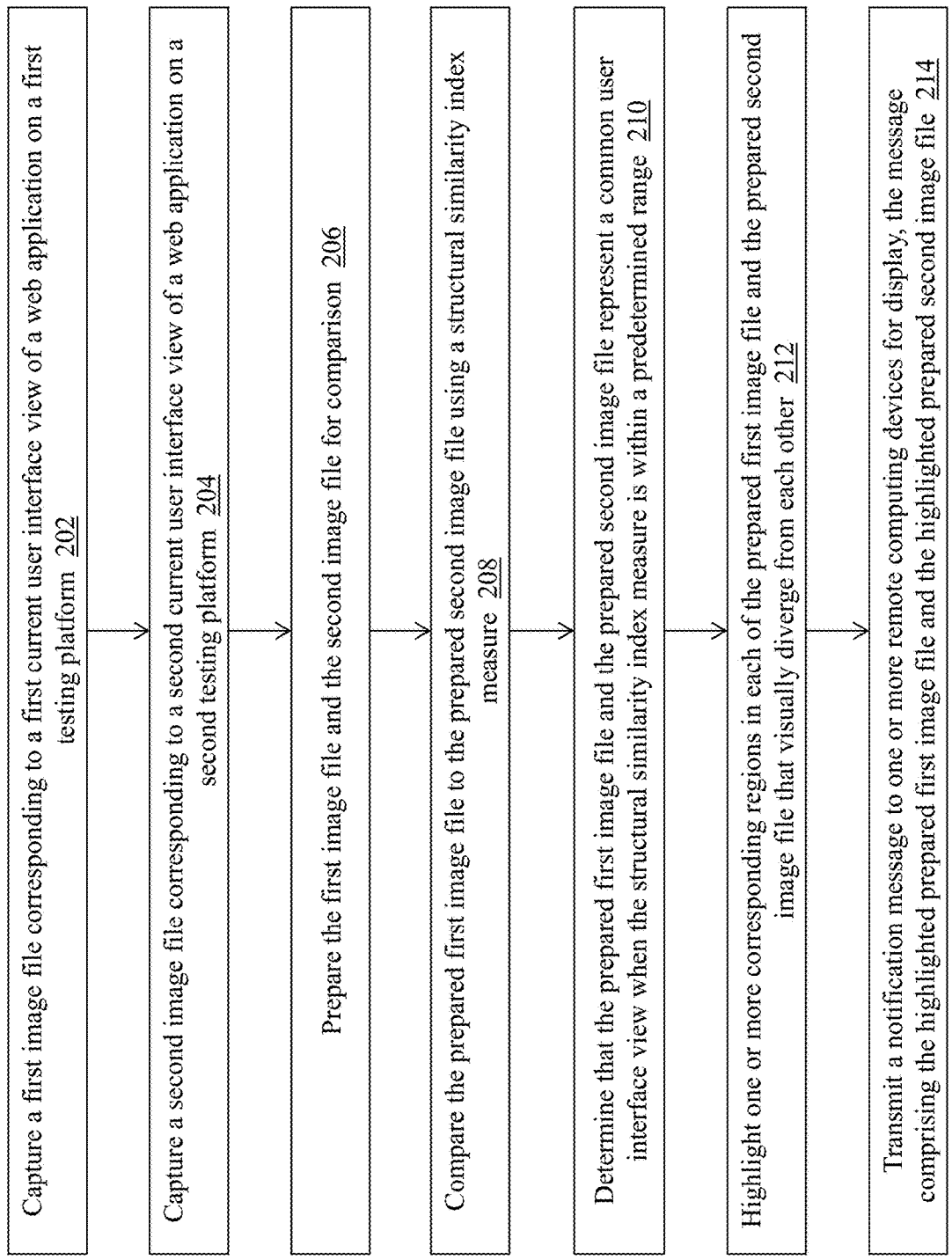
FIG. 2 is a flow diagram of a computerized method of automated cross-browser user interface testing.

FIG. 2 is a flow diagram of a computerized method 200 of automated cross-browser user interface testing, using the system 100 of FIG. 1. As explained above, to initiate execution of one or more test scripts against web pages and/or web applications on one or more testing platforms that are made available at either of browser testing frameworks 110*a*, 110*b*, client computing device 102 can issue one or more commands to browser testing frameworks 110*a*, 110*b*, which in response generates and executes test scripts against one or more web applications (as rendered using any specific browser types or versions, hardware device form factors, operating system versions, etc.) and captures data associated with the test execution. For example, browser testing frameworks 110*a*, 110*b* can capture one or more images (e.g., .JPG, .GIF, .PNG files) of a user interface screen and/or web page of the application rendered on the testing platform at various points during execution of the text scripts. Screenshots of exemplary UI images are provided as FIGS. 5A-5F and 6A-6B herein, and will be referenced in detail below. Browser testing frameworks 110*a*, 110*b* can store these images in database 108 for retrieval by server computing device 106 and/or browser testing frameworks 110*a*, 110*b* can transmit these images (e.g., in batch or in real-time) to server computing device 106 for analysis.

In some embodiments, browser testing frameworks 110*a*, 110*b* generate a baseline test script for a particular web application using, e.g., Selenium™ IDE as a browser extension (such as Chrome™) to record actions in the web application (e.g., clicks, typed input, etc.) that will be used to generate the steps of the test script as a Selenium™ Python file (.py). For example, a user at client computing device 102 can connect to browser testing frameworks 110*a*, 110*b*, launch a web browser, and provide a URL that references the web application to be tested. Upon connecting to browser testing frameworks 110*a*, 110*b* and activating the web application, the user can start recording in Selenium™ IDE and then interact with the web application (e.g., click, type input, etc.), during which Selenium™ IDE records each interaction to generate a corresponding test script in Python. An exemplary baseline test script excerpt generated by browser testing frameworks 110*a*, 110*b* is shown in FIG. 3. As shown in FIG. 3, the test script comprises several statements 302 that relate to actions performed during recording on one or more UI elements. For example, the user performed a number of different actions—including resizing the browser window ("self.driver.set_window_size(1936, 1056)"); typing text into a userId-input textbox ("self driver.find_element(By.ID, 'userId-input').send_keys(' guest1)"); and clicking on a password textbox ("self-driver.find_element(By.ID, 'password').click( )"), among others. In some embodiments, the baseline test script also indicates which browser software 304 was used to generate the test script (e.g., 'webdriver.Chrome( )'). As can be appreciated, in some embodiments a custom-generated or adhoc test script can be generated by a user and provided to browser testing frameworks 110a, 110b as the baseline test script.

Once the baseline test script is generated, the baseline test script can be customized according to one or more specific browser types, browser capabilities, and/or browser configurations on which the web application will be tested. In some embodiments, the baseline test script is modified to include a path of the browser executable file (.exe) that will be launched for testing the web application (e.g., for an Internet Explorer™ browser, the path can be "webdriver.ie (capabilities=capabilities; executablepath=r'C:\Users\IEDriverServer.exe')". This instruction tells the browser testing frameworks 110a, 110b to launch the IE browser executable at the corresponding path and using the capabilities passed in via the capabilities variable). As shown in the script of FIG. 3, the line "from.selenium.web-driver.common.desired_capabilities import DesiredCapabilities" enables a user at client computing device 102 to create a set of parameters or defined variables (called DesiredCapabilities) that are used to configure the executing browser software during testing. An exemplary set of capability parameters is set forth in FIG. 4.

Finally, the baseline test script can be updated to include commands to capture screenshots of the browser window that displays the web application at certain steps in the script. The screenshots are used by modules 106a-106c of server computing device 106 as described herein for comparison and determining whether any UI errors or deficiencies exist. In some embodiments, these commands can be defined to capture screenshots of certain portions of the user interface view and/or capture screenshots upon the occurrence of one or more events or actions during the script execution. In some embodiments, the script can be updated to include commands that capture: (i) a screenshot of the entire web application view or web page, (ii) a screenshot of the entire web application view or web page, when a user action occurs (e.g., click, user input, etc.); (iii) a screenshot of a body of the web page; or (iv) a screenshot of a specific user interface element in the web page (e.g., a text box, a button, a label, a text area, etc.). Exemplary script commands for capturing screenshots are provided below:

S=lambdaX:driver.execute_script('return document.body.parentNode.scroll'+X)

driver.set_window_size(S('Width'),S('Height'))

driver.get_screenshot_as_file('screen-shotChrome.png')

driver.find_element_by_tag_name('body').screenshot ('web_screenshotIRE.png')

Figure 5A:
FIG. 5A is a diagram of an exemplary screenshot of a current user interface view of a login screen for a web application.

Image capture module 106a of server computing device 106 captures (step 202) a first image file corresponding to a first current user interface view of a web application on a first platform, e.g., as the web application is tested on browser testing frameworks 110a, 110b. For example, during testing of the web application on the first platform, image capture module 106a can take one or more screenshots of a user interface view (i.e., a web page) of the web application under test as displayed in the browser on the first platform. FIGS. 5A-5F are exemplary screenshots captured by image capture module 106a of a web application during execution of an automated test script by browser testing frameworks 110a, 110b. FIG. 5A is a screenshot of a current user interface view of a login screen for a web application.

As shown in FIG. 5A, the test user and/or testing framework 110a, 110b has not yet entered any text into the username 502 or password 504 text fields, or clicked the Log In button 506. Image capture module 106a captures a screenshot of the web page at this step in the test script.

Figure 5B:
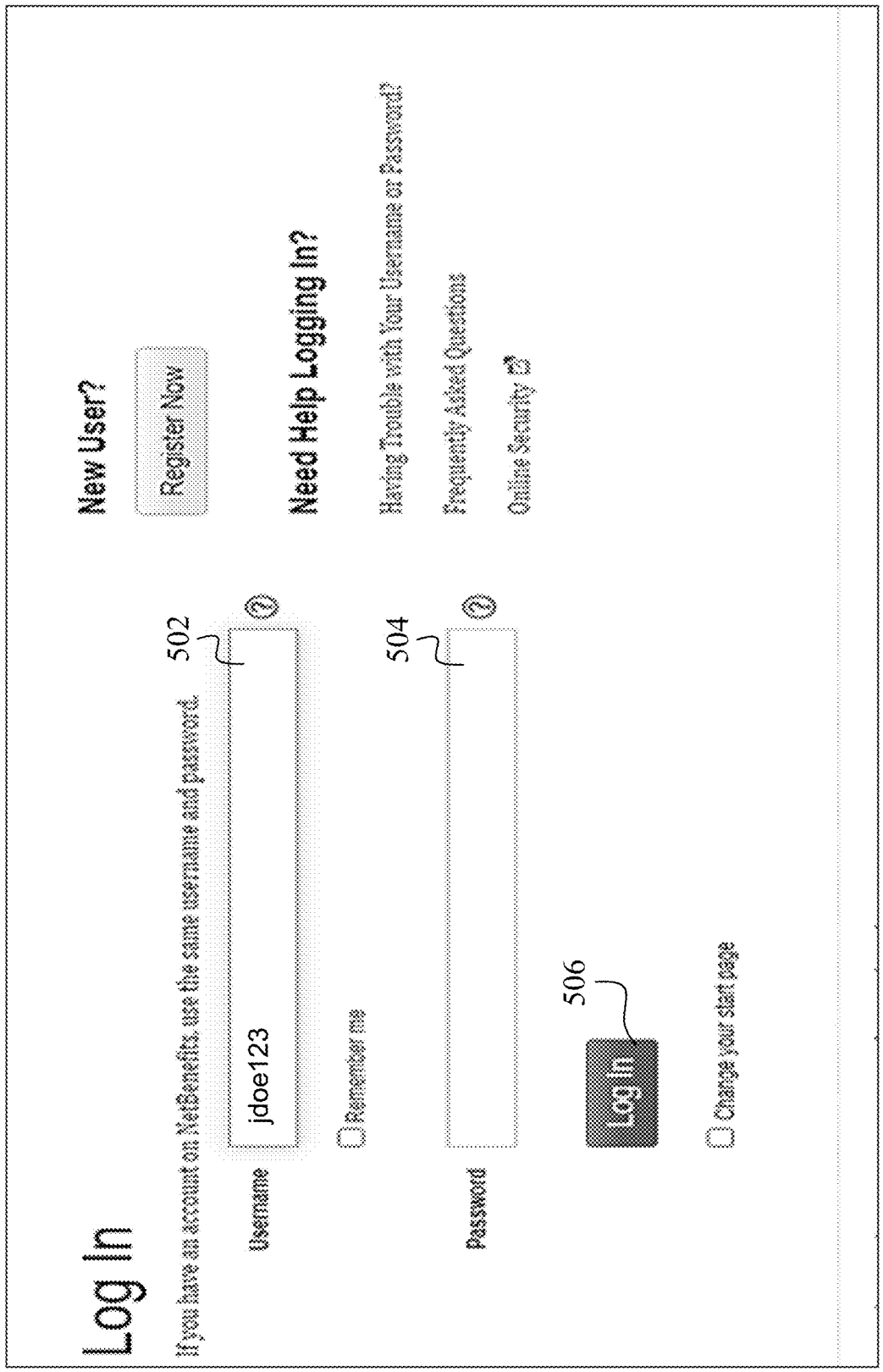
FIG. 5B is a diagram of an exemplary screenshot of the current interface view of the login screen for the web application, after a username is entered.
Figure 5C:
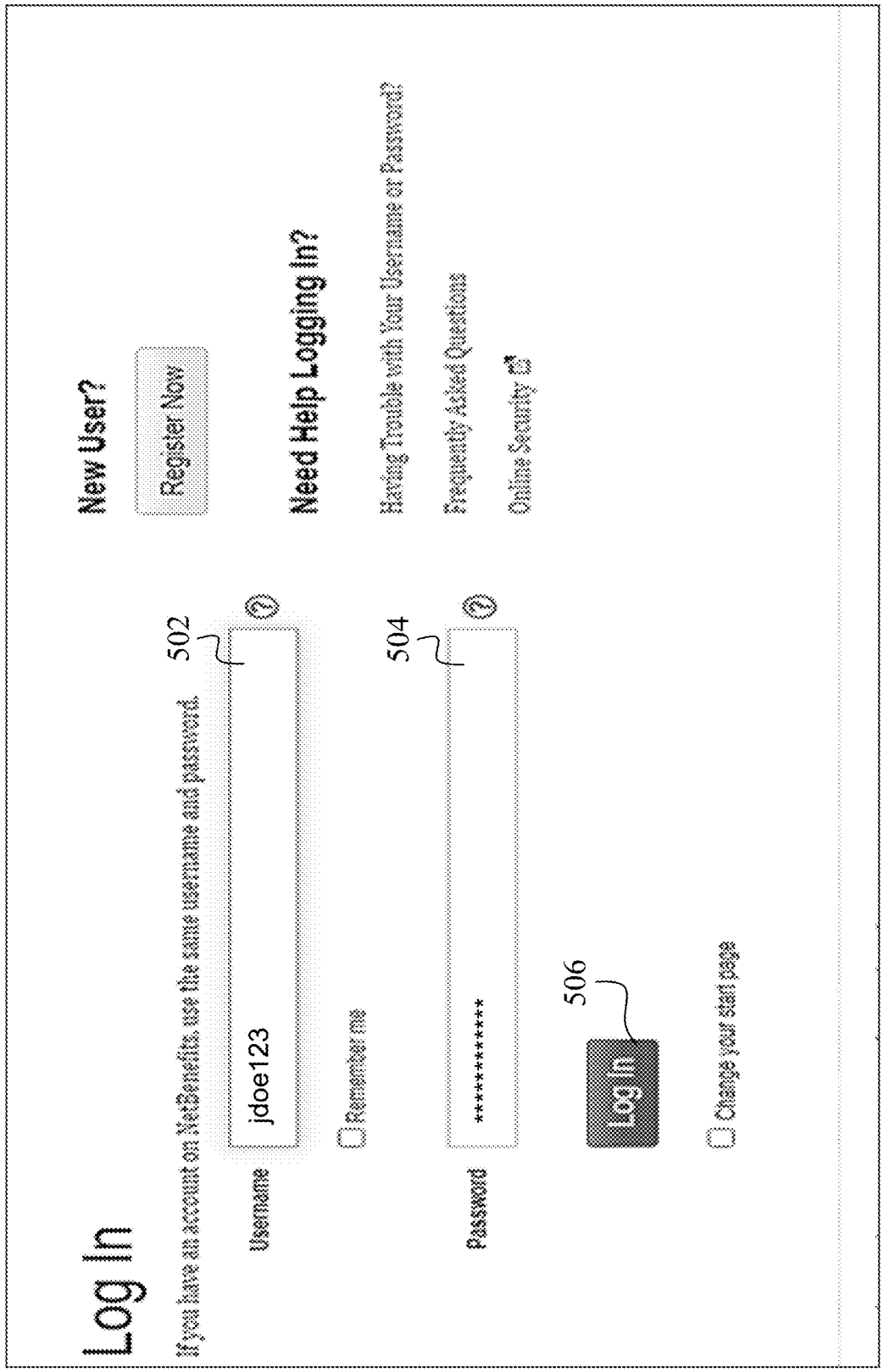
FIG. 5C is a diagram of an exemplary screenshot of the current interface view of the login screen for the web application, after a password is entered.

FIG. 5B is a screenshot of the current interface view of the login screen for the web application, captured by image capture module 106b after a username is entered in username 502 text field. As shown in FIG. 5B, the test user and/or testing framework 110a, 110b has provided a user name in the username field 502 (e.g., 'jdoe123') and the test script executed by browser testing framework 110a, 110b includes a command to capture a screenshot of the user interface after a user name is entered. Similarly, FIG. 5C is a screenshot of the current interface view of the login screen for the web application, captured by image capture module 106a after a password is entered in password 504 text field. Then, the test user and/or browser testing framework 110a, 110b activates the button 506 to test the login and authentication functionality of the web application and continue with the test.

Figure 5D:
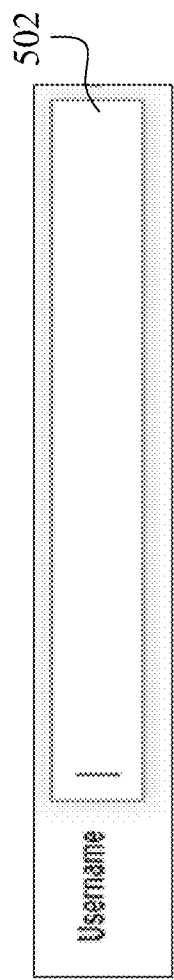
FIG. 5D is a diagram of an exemplary screenshot of the username text field.
Figure 5E:
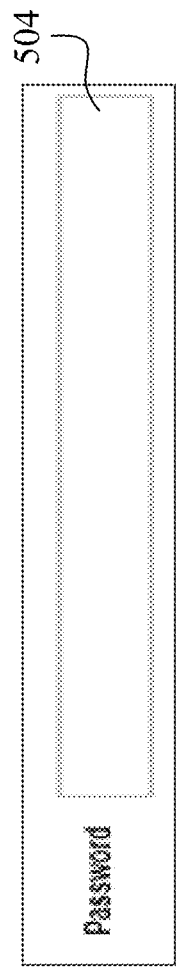
FIG. 5E is a diagram of an exemplary screenshot of the password text field.
Figure 5F:
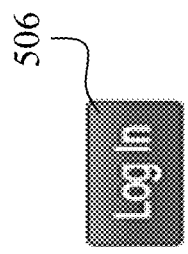
FIG. 5F is a diagram of an exemplary screenshot of the log in button.

Image capture module 106a can also capture screenshots of specific UI elements as shown in FIGS. 5D-5F. As described above, the test script can include a command to browser testing framework 110a, 110b to capture a screenshot of certain UI elements (identified by tag name). Browser testing framework 110a, 110b instructs image capture module 106a to collect these screenshots for comparison. FIG. 5D is a screenshot of the username text field 502, FIG. 5E is a screenshot of the password text field 504, and FIG. 5F is a screenshot of the Log In button 506. It should be appreciated that image capture module 106a can capture a screenshot of a user interface element such as a text field either with or without text appearing in the field. As will be described below, image comparison module 106b can analyze and compare screenshots of specific UI elements from different platforms—while also taking into account potential differences in the text or removing or disregarding differences in the text (thereby focusing on other elements of comparison such as position of the textbox, shape of the textbox, etc.).

Similarly, image capture module 106a captures (step 204) a second image file corresponding to a second current user interface view of a web application on a second platform during testing of the browser application on one or more of browser testing frameworks 110a, 110b. As can be appreciated, the second platform can differ from the first platform in any number of different respects, including but not limited to: different browser type (e.g., Chrome™ vs. Safari™); different version number of the same browser type (e.g., Firefox™ version 95.0 vs. Firefox™ version 92.0); different operating system using same browser type/version (e.g., Apple™ iOS™ executing Chrome™ vs. Android™ executing Chrome™); different device form factor using same browser type (e.g., Apple™ iPhone™ X executing Safari™ vs. Apple™ iPhone™ 13 executing Safari™), and so forth. As such, a wide variety of technical hardware and/or software permutations can be envisioned within the scope of the technology described herein, as differences between the first platform being tested and the second platform being tested.

Also, in preferred embodiments, the web application and/or web pages being tested on the first platform is the same as the browser application being tested on the second platform so that images of the same user interface screens or user interface elements rendered on the different platforms can be compared to identify display variations or errors on specific platforms. For example, the first image file can correspond to a particular user interface view as rendered on the first platform and the second image file can correspond to the same user interface view as rendered on the second platform. Ideally, the first image file should display the same information and UI elements in the same configuration and arrangement as the second image file—so that users accessing the web application on different devices, browsers, etc. have essentially the same experience. In order to determine whether these differences in platform do give rise to any UI errors or display variations, system 100 can perform a specialized technical process whereby the first image file and the second image file are compared using a structural similarity index measure. When the structural similarity index measure generated by comparing the image files is within a particular range, system 100 can determine that the UI elements/web pages for the web application on the respective first platform and second platform are being rendered appropriately and do not contain any significant errors or deficiencies.

Figure 6A:
FIG. 6A is a diagram of an exemplary image of a current user interface view of an account summary screen in a web application rendered on a first testing platform.
Figure 6B:
FIG. 6B is a diagram of an exemplary image of a current user interface view of an account summary screen in the web application rendered on a second testing platform.

FIG. 6A is a diagram of an exemplary image 602 of a current user interface view of an account summary screen in a web application rendered on a first testing platform (e.g., using the IE™ 11 browser), as captured by image capture module 106a. FIG. 6B is a diagram of an exemplary image 604 of a current user interface view of an account summary screen in a web application rendered on a second testing platform (e.g., using the Chrome™ browser), as captured by image capture module 106a. Image capture module 106a captures these screenshots during execution of test scripts in browser testing frameworks 110a, 110b (steps 202 and 204 of FIG. 2) and imports the images for pre-processing. Exemplary commands for importing the images 602 and 604 respectively are:

```
imageA=cv2.imread(r'C:\
    Users\Desktop\body_ie.png')

imageB=cv2.imread(r'C:\
    Users\Desktop\body_chrome.png')
```

Image capture module 106a then prepares (step 206) the first image file and the second image file for comparison by image comparison module 106b. Before the first image file and the second image file can be accurately compared for matching and to reduce the occurrence of false positive matches when doing a pixel-based comparison, image capture module 106a performs several pre-processing steps to conform the images to have common characteristics. In some embodiments, image capture module 106a programmatically fixes a size of each image (e.g., by cropping each image to the same width/height. Exemplary commands for fixing the size of images 602 and 604 are below:

```
crop_imgA=imageA[200:1600,200:1600]

crop_imgB=imageB[200:1600,200:1600]
```

Figure 7A:
FIG. 7A is a diagram of the exemplary image of FIG. 6A after conversion to grayscale and flattening by image capture module.

Also, different browsers may interpret styles such as shadows and borders differently, which can cause discrepancies in the image comparison that are not material. To account for this, image capture module 106a can prepare the images using certain image conversion techniques. In some embodiments, image capture module 106a converts the images to grayscale and/or flatten the images by converting them from a red-green-blue (RGB) color model to a Hue, Saturation, Value (HSV) color model. FIG. 7A is a diagram of the exemplary image 602 from FIG. 6A after conversion to grayscale and flattening by image capture module 106a.

Figure 7B:
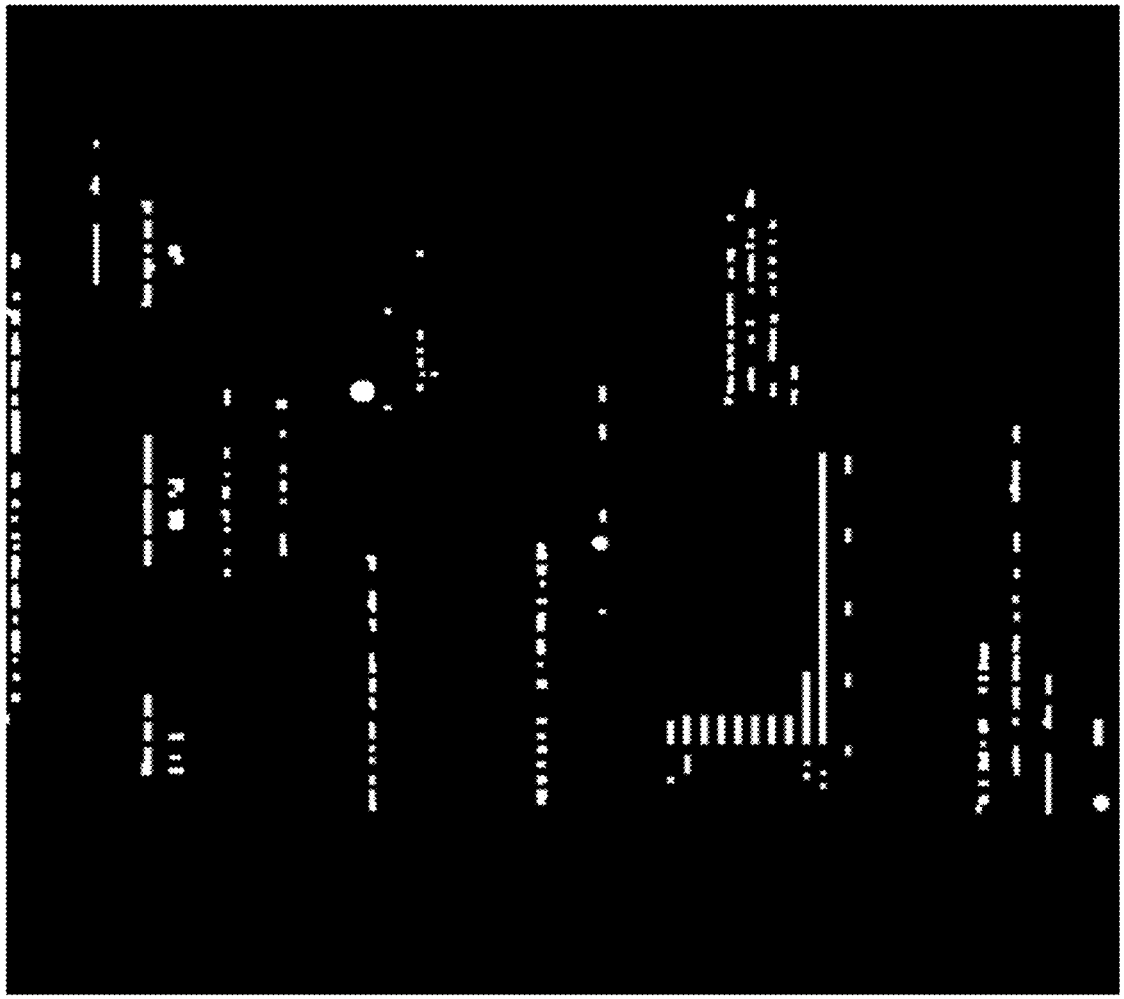
FIG. 7B is a diagram of the exemplary image of FIG. 6B after conversion to grayscale and flattening by image capture module.

FIG. 7B is a diagram of the exemplary image 604 from FIG. 6B after conversion to grayscale and flattening by image capture module 106a.

After preparation of the first image file and the second image file, image comparison module 106b of server computing device 106 compares (step 208) the prepared first image file to the prepared second image file using a structural similarity index measure (SSIM). SSIM is a image comparison technique that is commonly used in a variety of applications, such as detecting anomalies in texture and pattern of clothes in images. Further information on the application of SSIM for image comparison is described at, e.g., ourcodeworld.com/articles/read/991/how-to-calculate-the-structural-similarity-index-ssim-between-two-images-with-python, which is incorporated herein by reference. Image comparison module 106b can utilize the scikit-image image processing library in Python (available at scikit-image.org) to perform the SSIM analysis. Generally SSIM is performed using a pixel-based comparison, where a pixel (or pixel color value) at a first location in the first image file is compared to the pixel at the same location in the second image file. The value returned by an SSIM analysis is between 0 and 1, where 0 indicates that the images are completely different and 1 indicates the images are exactly the same. Therefore, SSIM values closer to 1 are indicative that two images only comprise very minor differences, in some cases indistinguishable to the eye. Due to the pixel-based comparison of SSIM, false positives may occur—which is the reason behind preparing the first image file and the second image file as set forth above.

After preparation of the first image file and the second image file, in some embodiments the respective images may be different sizes and/or orientations—e.g., they may have originated from different devices (such as mobile device vs. desktop), image comparison module 106b of server computing device 106 can perform the comparison step 208 of the prepared first image file to the prepared second image file using a scale invariant feature transform (SIFT) algorithm as the structural similarity index measure. SIFT, or Scale Invariant Feature Transform, is a feature detection algorithm in computer vision. SIFT helps locate the local features in an image, commonly known as the 'keypoints' of the image. These keypoints are scale and rotation invariant that can be used for various computer vision applications, like image matching, object detection, scene detection, etc. At a high level, module 106b can execute a SIFT algorithm to locate one or more keypoints in each of the first image file and the second image file, generate descriptors (e.g., multidimensional vectors) for the located keypoints, and then compare the descriptors to determine whether the keypoints (and thus the images) match. An exemplary SIFT algorithm that can be used by module 106b is described in D. Lowe, "Distinctive Image Features from Scale-Invariant Keypoints," International Journal of Computer Vision 60, 91-110 (2004), doi.org/10.1023/B:VISI.0000029664.99615.94, which is incorporated herein by reference.

In some embodiments, image comparison module 106b can run the comparison (step 208) of the first prepared image file and the second prepared image file multiple times in order to obtain a range of SSIM values—so that very small differences in the images due to the sheer rendering style of specific browsers do not cause the generation of anomalies that must be investigated. For example, when image comparison module 106b returns an SSIM range of 0.95 to 1 for multiple executions of the comparison process, it is highly likely that the images represent the same user interface view of the web application. Thus, using the SSIM range, image comparison module 106b determines (step 210) that the prepared first image file and the prepared second image file represent a common user interface view when the structural similarity index measure is within a predetermined range.

Furthermore, as can be appreciated, many of the differences in pixel-based comparison between the first image file and the second image file result from slight variations in the rendering of text—even though the text content is exactly the same. Image comparison module 106b can analyze and compare corresponding text sections of the first image file and the second image file (as captured by image capture module 106a and prior to application of the cropping/flattening steps) to confirm whether the text is the same or contains anomalies that need to be fixed. In some embodiments, image comparison module 106b identifies portions of the images from the respective image files that correspond to text sections, along with the location coordinates of the text sections, extracts the text using, e.g., an optical character recognition (OCR) algorithm, and compares the extracted text. An exemplary OCR algorithm that can be used by image comparison module 108b is the Tesseract OCR engine (available at opensource.google/projects/tesseract). When differences between the extracted text are identified and/or differences in other aspects of the images are identified, module 106b highlights (step 212) one or more corresponding regions in each of the prepared first image file and the prepared second image file that visually diverge from each other. Using the example of text, image comparison module 106b can draw contours around corresponding regions in each file that comprise different text and/or differences in the appearance or layout of text (such as spacing issues, letter size, etc.). In some embodiments, image comparison module 108b can highlight regions of each image file that are the same using a first color and highlight regions of each image file that are different using a second color, to enable users to easily identify the differences.

Figure 8:
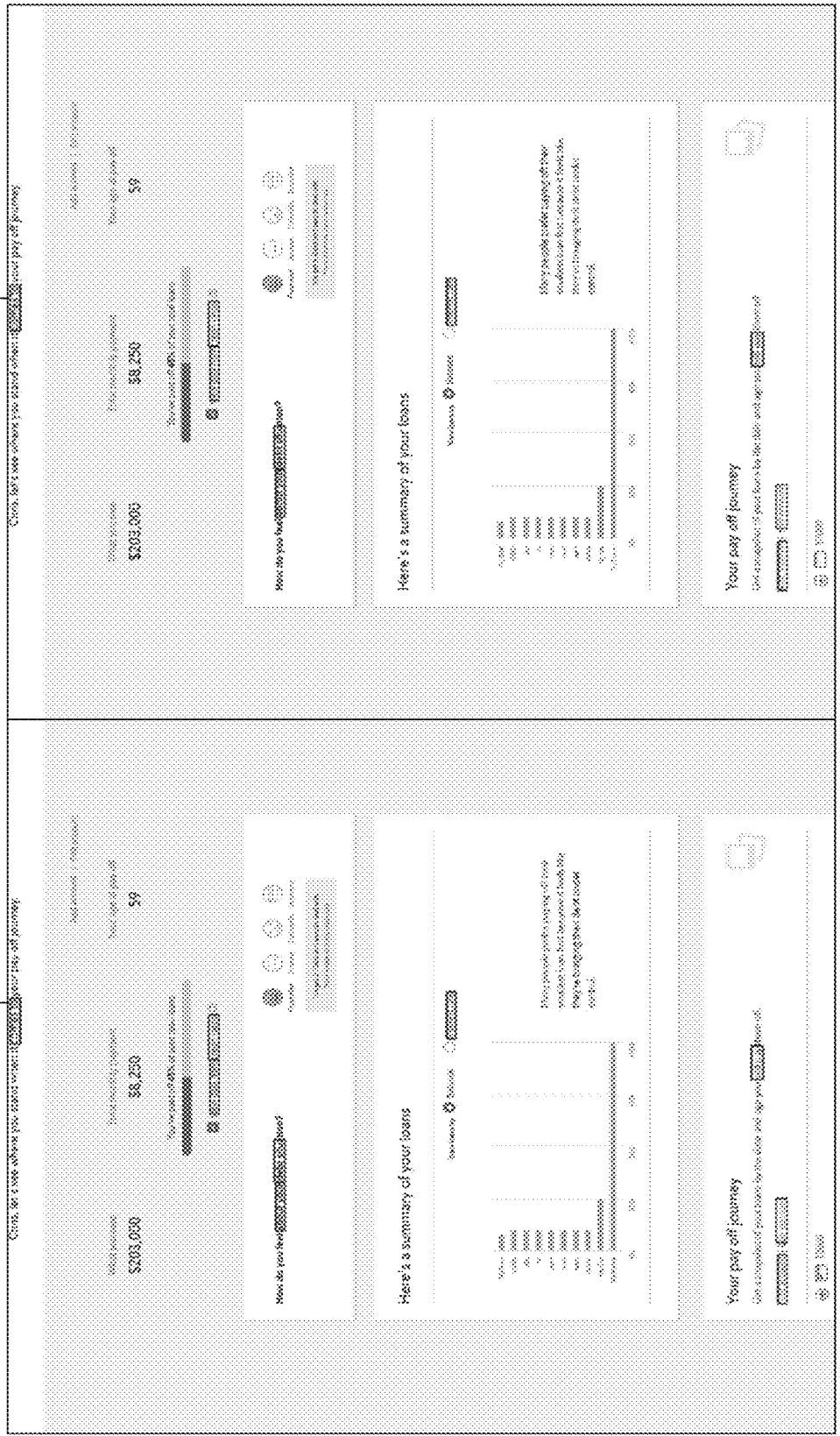
FIG. 8 is a diagram of a side-by-side comparison between the first image file and the second image with contours identifying text sections of the images that comprise differences between the images.

FIG. 8 is a diagram of a side-by-side comparison between the first image file and the second image with contours identifying text sections of the images that comprise differences between the images. As shown in FIG. 8, each pair of image sections that contain differences (e.g., 802a, 802b) is highlighted by contours around the specifically-identified differences. Image comparison module 106b can edit the first image file and the second image file to include the contours and save the edited images as, e.g., new images in database 108.

FIG. 9 is a diagram of a side-by-side comparison between the first image file and the second image using a scale invariant feature transform with keypoints identifying local image features in the images and plotted to show the matching features. As shown in FIG. 9, the images are of different sizes so module 106b can utilize SIFT to compare the images. Module 106b detects keypoints in each of the desktop screenshot image 902 and the mobile device image 904 and matching keypoints (based on comparison of the descriptors) are connected using a line (e.g., lines 906).

Once the differences (if any) are identified and highlighted, notification module 106c transmits (step 216) transmits a notification message to one or more remote computing devices (e.g., client computing device 102) for display. In some embodiments, the message comprises the highlighted prepared first image file and the highlighted prepared second image file (e.g., as shown in FIG. 8). For example, a user at client computing device 102 can be a quality assurance engineer or other member of the development staff that is tasked with performing automated testing of a web application to ensure compatibility with a variety of different testing platforms. The user can receive the notification message at a defined time (e.g., after the automated test script is executed) and quickly determine whether any platform-specific anomalies have occurred in the user interface of the web application and which must be remediated.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated cross-browser user interface testing, the method comprising:
    capturing, by a computing device, a first image file corresponding to a first current user interface view of a web application on a first testing platform;
    capturing, by the computing device, a second image file corresponding to a second current user interface view of a web application on a second testing platform;
    preparing, by the computing device, the first image file and the second image file for comparison, including converting the first image file and the second image file to greyscale images or to a hue-saturation-value (HSV) representation;
    comparing, by the computing device, the prepared first image file to the prepared second image file using a structural similarity index measure, including locating a plurality of local features in each of the prepared first image file and the prepared second image file, generating descriptors for each of the plurality of local features, and comparing the descriptor for each local feature in the prepared first image file to a corresponding descriptor for each local feature in the prepared second image file to generate the structural similarity index measure;
    determining, by the computing device, that the prepared first image file and the prepared second image file represent a common user interface view when the structural similarity index measure is within a predetermined range;
    highlighting, by the computing device, one or more corresponding regions in each of the prepared first image file and the prepared second image file that visually diverge from each other; and
    transmitting, by the computing device, a notification message to one or more remote computing devices for display, the notification message comprising the highlighted prepared first image file and the highlighted prepared second image file.

2. The method of claim 1, wherein the first testing platform and the second testing platform comprise different operating systems or different versions of a same operating system.

3. The method of claim 1, wherein the first testing platform and the second testing platform comprise different hardware devices or different hardware device form factors.

4. The method of claim 1, wherein the web application on the first platform is rendered using a different browser type than the browser type that render the web application on the second platform.

5. The method of claim 1, wherein preparing the first image file and the second image file for comparison further comprises adjusting a size of the first image file to match a size of the second image file, adjusting a size of the second image file to match a size of the first image file, and removing text from each of the first image file and the second image file.

6. The method of claim 5, wherein removing text from each of the first image file and the second image file comprises performing an optical character recognition (OCR) process on each of the first image file and the second image file and removing text identified via the OCR process from each of the first image file and the second image file.

7. The method of claim 6, wherein the removed text from the first image file is compared to the removed text from the second image file to determine one or more similarities or differences.

8. The method of claim 1, wherein the structural similarity index measure is further based on a comparison between one or more pixels of the prepared first image file and one or more pixels of the prepared second image file.

9. The method of claim 1, wherein highlighting one or more corresponding regions in each of the prepared first image file and the prepared second image file that visually diverge from each other comprises generating a contour around each of the one or more corresponding regions in each of the prepared first image file and the prepared second image file that visually diverge from each other.

10. The method of claim 9, wherein the contour comprises a visual indicator identifying the corresponding regions in each of the prepared first image file and the prepared second image file.

11. The method of claim 1, wherein the first current user interface view of the web application on the first testing platform comprises one of: a view of an entire web page in the web application or a view of a single user interface element of the web page in the web application.

12. The method of claim 1, wherein the second current user interface view of the web application on the second testing platform comprises one of: a view of an entire web page in the web application or a view of a single user interface element of the web page in the web application.

13. A system for automated cross-browser user interface testing, the system comprising a computing device with a memory for storing computer-executable instructions and a processor that executes the computer-executable instructions to:
   capture a first image file corresponding to a first current user interface view of a web application on a first testing platform;
   capture a second image file corresponding to a second current user interface view of a web application on a second testing platform;
   prepare the first image file and the second image file for comparison, including converting the first image file and the second image file to greyscale images or to a hue-saturation-value (HSV) representation;
   compare the prepared first image file to the prepared second image file using a structural similarity index measure, including locating a plurality of local features in each of the prepared first image file and the prepared second image file, generating descriptors for each of the plurality of local features, and comparing the descriptor for each local feature in the prepared first image file to a corresponding descriptor for each local feature in the prepared second image file to generate the structural similarity index measure;
   determine that the prepared first image file and the prepared second image file represent a common user interface view when the structural similarity index measure is within a predetermined range;
   highlight one or more corresponding regions in each of the prepared first image file and the prepared second image file that visually diverge from each other; and
   transmit a notification message to one or more remote computing devices for display, the notification message comprising the highlighted prepared first image file and the highlighted prepared second image file.

14. The system of claim 13, wherein the first testing platform and the second testing platform comprise different operating systems or different versions of a same operating system.

15. The system of claim 13, wherein the first testing platform and the second testing platform comprise different hardware devices or different hardware device form factors.

16. The system of claim 13, wherein the web application on the first platform is rendered using a different browser type than the browser type that render the web application on the second platform.

17. The system of claim 13, wherein preparing the first image file and the second image file for comparison further comprises adjusting a size of the first image file to match a size of the second image file, adjusting a size of the second image file to match a size of the first image file, and removing text from each of the first image file and the second image file.

18. The system of claim 17, wherein removing text from each of the first image file and the second image file comprises performing an optical character recognition (OCR) process on each of the first image file and the second image file and removing text identified via the OCR process from each of the first image file and the second image file.

19. The system of claim 18, wherein the removed text from the first image file is compared to the removed text from the second image file to determine one or more similarities or differences.

20. The system of claim 13, wherein the structural similarity index measure is further based on a comparison between one or more pixels of the prepared first image file and one or more pixels of the prepared second image file.

21. The system of claim 13, wherein highlighting one or more corresponding regions in each of the prepared first image file and the prepared second image file that visually diverge from each other comprises generating a contour around each of the one or more corresponding regions in each of the prepared first image file and the prepared second image file that visually diverge from each other.

22. The system of claim 21, wherein the contour comprises a visual indicator identifying the corresponding regions in each of the prepared first image file and the prepared second image file.

23. The system of claim 13, wherein the first current user interface view of the web application on the first testing platform comprises one of: a view of an entire web page in the web application or a view of a single user interface element of the web page in the web application.

24. The system of claim 13, wherein the second current user interface view of the web application on the second testing platform comprises one of: a view of an entire web page in the web application or a view of a single user interface element of the web page in the web application.

25. The method of claim 1, further comprising performing, by the server computing device, the comparison step a plurality of times and generating a range of structural similarity index measures based upon the plurality of comparisons.

26. The system of claim 13, wherein the server computing device performs the comparison step a plurality of times and generates a range of structural similarity index measures based upon the plurality of comparisons.

* * * * *